(12) United States Patent
Hirakata

(10) Patent No.: US 9,831,801 B2
(45) Date of Patent: Nov. 28, 2017

(54) THREE-PHASE INVERTER SYSTEM INCLUDING CONTROL CIRCUIT TO DETECT FAILURE IN AN OUTPUT CURRENT SENSOR

(71) Applicant: FUJI ELECTRIC CO., LTD., Kawasaki-shi, Kanagawa (JP)

(72) Inventor: Masaki Hirakata, Hino (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 0 days.

(21) Appl. No.: 15/231,183

(22) Filed: Aug. 8, 2016

(65) Prior Publication Data

US 2017/0077835 A1   Mar. 16, 2017

(30) Foreign Application Priority Data

Sep. 16, 2015  (JP) ................. 2015-182477

(51) Int. Cl.
| | |
|---|---|
| *G05F 1/573* | (2006.01) |
| *H02H 7/122* | (2006.01) |
| *H02M 7/757* | (2006.01) |
| *H02M 5/42* | (2006.01) |
| *H02M 7/68* | (2006.01) |
| *H02M 3/24* | (2006.01) |
| *H02M 7/44* | (2006.01) |
| *H02M 7/5387* | (2007.01) |

(Continued)

(52) U.S. Cl.
CPC ........... *H02M 7/5387* (2013.01); *H02M 1/08* (2013.01); *H02M 7/53875* (2013.01); *H02M 2001/0009* (2013.01)

(58) Field of Classification Search
CPC .................................................. H02M 7/53875
USPC ...... 323/273–278, 285; 363/37, 56.01–56.04, 363/56.1, 78, 79, 95, 97, 98, 131, 132, 363/135–138
See application file for complete search history.

(56) References Cited

U.S. PATENT DOCUMENTS

| 8,934,274 B2 | 1/2015 | Kawashima | |
|---|---|---|---|
| 2012/0217795 A1* | 8/2012 | Hasegawa | ............... B60L 3/003 307/9.1 |

(Continued)

FOREIGN PATENT DOCUMENTS

| JP | 2008-22645 | 1/2008 |
|---|---|---|
| JP | 5304967 | 10/2013 |

*Primary Examiner* — Adolf Berhane
*Assistant Examiner* — Gary Nash

(57) ABSTRACT

A three-phase inverter system, in one configuration, includes an inverter main circuit and a control circuit. The inverter system includes current sensors which detect output currents in, for example, U- and W-phases, respectively, the inverter main circuit includes a semiconductor switching device with a current sense which is provided in, for example, the V-phase. The control circuit is configured to detect current values from the current sensors inputted thereto and produce driving signals, which drive the upper-arm and lower-arm semiconductor switching devices of the inverter main circuit, based on the detected current values, estimate, based on a detected signal from the semiconductor switching device with the current sense, an output current value in the one of the three series circuits, and detect failure in at least one of the current sensors based on the detected current values from the two current sensors and the estimated output current value.

10 Claims, 4 Drawing Sheets

(51) Int. Cl.
*H02M 1/08* (2006.01)
*H02M 1/00* (2006.01)

(56) References Cited

U.S. PATENT DOCUMENTS

| | | | |
|---|---|---|---|
| 2013/0127383 A1* | 5/2013 | Kawamura | H02P 27/085 318/400.09 |
| 2014/0226380 A1* | 8/2014 | Kawashima | H02M 7/539 363/97 |

* cited by examiner

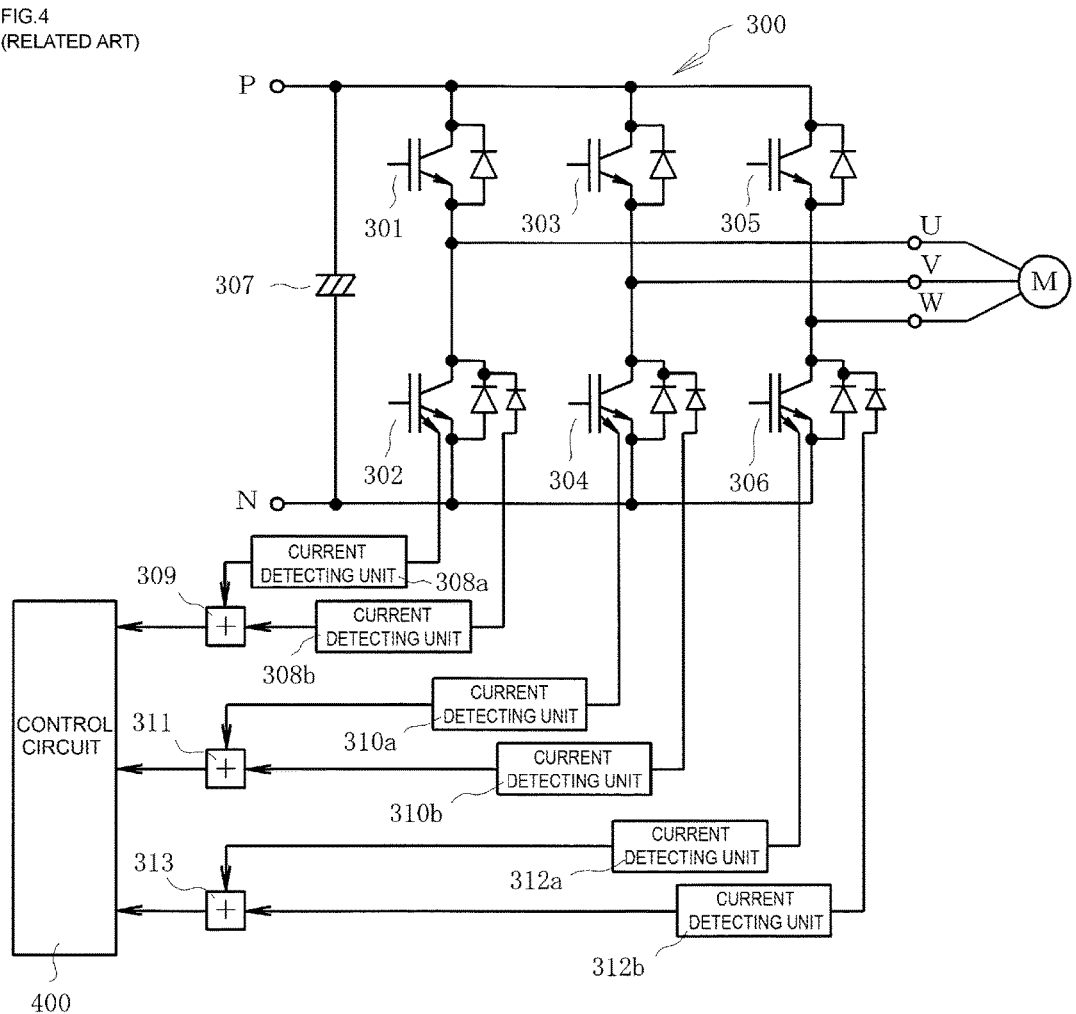

THREE-PHASE INVERTER SYSTEM INCLUDING CONTROL CIRCUIT TO DETECT FAILURE IN AN OUTPUT CURRENT SENSOR

CROSS-REFERENCE TO RELATED APPLICATIONS

This application is based on, and claims foreign priority benefit to, Japanese Patent Application No. 2015-182477, filed Sep. 16, 2015, in the Japanese Patent Office, the content of which is incorporated herein by reference in its entirety.

BACKGROUND

1. Field

The present disclosure relates to a technology of detecting a failure in an output current sensor in a three-phase inverter system.

2. Related Art

FIG. 3 is a diagram showing the configuration of the motor driving system described in Japanese patent application publication JP-A-2008-22645 (paragraphs [0023] to [0028], FIG. 1 and FIG. 2, etc.).

In FIG. 3, the motor driving system is provided with a DC power supply 101, an inverter 102 in three phases, current sensors 103$u$, 103$v$ and 103$w$ detecting output currents in the U-, V- and W-phases in the inverter 102, respectively, and a control system 200. The control system 200 is further provided with a current detecting unit 201, a current estimating unit 202, a current sensor failure estimating unit 203 and a control circuit 204. The reference sign M designates a motor.

In a normal operation of the system, the current sensors 103$u$, 103$v$ and 103$w$ detect the output currents in the U, V and W phases, respectively, of the inverter 102 and the detected outputs of the current sensors 103$u$, 103$v$ and 103$w$ are provided as detected current values $i_u$, $i_v$ and $i_w$ in the U, V and W phases, respectively, through the current detecting unit 201. The control circuit 204, on the basis of the detected current values $i_u$, $i_v$ and $i_w$, produces switching commands to carry out on-off control of semiconductor switching devices in the inverter 102. This makes the inverter 102 output three-phase AC voltages, each with specified magnitude and frequency to drive the motor M.

The current estimating unit 202, by using an arbitrary selection of two of the detected current values $i_u$, $i_v$ and $i_w$ outputted from the current detecting unit 201, for example, the detected current values $i_u$ and $i_v$ in the U and V phases, respectively, estimates the remaining detected current value in the W-phase (on the basis of the fact that $i_u+i_v+i_w=0$, the estimated current value $i_{wa}$ is to be given as $i_{wa}=-(i_u+i_v)$) and outputs the estimated current value $i_{wa}$ to the current sensor failure estimating unit 203. By repeatedly carrying out the operation, namely, the selection of detected current values in the arbitrary two phases and the arithmetic operation of the estimated current value in the remained one phase, at a constant period, the detected current values $i_u$, $i_v$ and $i_w$ and the estimated current values $i_{ua}$, $i_{va}$ and $i_{wa}$ in the U-, V- and W-phases, respectively, are to be successively inputted to the current sensor failure estimating unit 203.

The current sensor failure estimating unit 203, by using a detected current value in one period with respect to one of the three phases, obtains the averaged value of a current value in each phase and, when the averaged value is not zero in a certain phase, makes an assumption that the current sensor in the phase is in failure. When the failure of the current sensor 103$w$ in the W-phase is assumed, for example, such information is sent to the current detecting unit 201, from which the detected current values $i_u$ and $i_v$ in the U- and V-phases, respectively, except the W-phase are outputted to the control circuit 204. With respect to the W-phase, the estimated current value $i_{wa}$ obtained by the current estimating unit 202 is outputted to the control circuit 204.

By the foregoing operation, the control circuit 204 is to carry out a specified arithmetic processing by using the detected current values $i_u$ and $i_v$ and the estimated current value $i_{wa}$ and produce the switching commands.

According to the technology described in Japanese patent application publication JP-A-2008-22645, even though a certain current sensor in a certain phase is in failure, the use of the estimated current value in the phase and the detected current values in the other two phases enables the motor M to be driven by the inverter 102 without any problem.

In the related three-phase inverter system, however, current sensors must be provided for three phases, which causes a problem in that the size of the system is enlarged, so as to result in an increase in the cost thereof.

In addition, for the technology of detecting a failure in a current sensor, a technology is known in which two current sensors are used for one phase and detected values of the respective sensors are compared with each other. Such a redundant measure, however, is impossible to avoid an increase in size and an increase in cost like in the foregoing related system.

While, in Japanese Patent No. 5304967 (paragraphs [0005] to [0007], FIG. 1 and FIG. 10, etc.), a technology is disclosed which detects a current in each phase by a so-called semiconductor switching device with a current sense without using any current sensor.

FIG. 4 is a diagram showing the configuration of the motor driving system described in Japanese Patent No. 5304967. In FIG. 4, the motor driving system is provided with an inverter 300 in three phases (U-, V- and W-phases) including semiconductor switching devices 301 through 306 and a capacitor 307, current detecting units 308$a$, 308$b$, 310$a$, 310$b$, 312$a$ and 312$b$, adders 309, 311 and 313 and a control circuit 400. Reference sign M designates a motor. For each of the semiconductor switching devices 302, 304 and 306 in their respective lower arms in three phases in the inverter 300, a multi-emitter device is used as a semiconductor switching device with a current sense. The semiconductor switching device with a current sense is provided with a sense emitter and a sense diode.

In the foregoing inverter 300, a current flowing in the sense emitter and a current flowing in the sense diode in the semiconductor switching device 302 in the U-phase are detected by the current detecting unit 308$a$ and the current detecting unit 308$b$, respectively, and, along with this, the values of the detected currents are added by the adder 309. Moreover, a current flowing in the sense emitter and a current flowing in the sense diode in the semiconductor switching device 304 in the V-phase are detected by the current detecting unit 310$a$ and the current detecting unit 310$b$, respectively, and, along with this, the values of the detected currents are added by the adder 311. Furthermore, a current flowing in the sense emitter and a current flowing in the sense diode in the semiconductor switching device 306 in the W-phase are detected by the current detecting unit 312$a$ and the current detecting unit 312$b$, respectively, and, along with this, the values of the detected currents are added by the adder 313. This makes the output current in each phase of the inverter 300 estimated as a discrete sinusoidal wave.

SUMMARY

For achieving the foregoing objective, a first aspect of the disclosure is a three-phase inverter system including: an inverter main circuit in which three series circuits are connected in parallel, in each of which an upper arm having a semiconductor switching device and a lower arm having a semiconductor switching device are connected in series across a DC power supply to output an AC current for one phase as an output current with the connection point of the upper and lower arms provided as an AC output terminal, and the AC output terminal in each of the series circuits is connected to a load with a connection line as the AC output terminal in each phase of three-phase AC output; and a control circuit which has the detected values of the output currents of the inverter main circuit inputted thereto to produce the driving signals of the semiconductor switching devices.

In the system, two connection lines in two phases of the connection lines in three phases connecting their respective AC output terminals in three phases to the load are provided with two current sensors as their respective ones which detect the values of output currents flowing in the two connection lines, the inverter main circuit includes a semiconductor switching device with a current sense which device is provided as the semiconductor switching device in one of the upper arm and lower arm in one phase other than the two phases with the values of the output currents therein detected by the current sensors and further detects the current flowing in the one phase, and the control circuit includes: a driving signal producing means which has detected current values from the current sensors inputted thereto to produce the driving signals; a current estimating means which estimates, on the basis of a detected signal from the semiconductor switching device with a current sense, an output current value in the one phase in which the switching semiconductor device with a current sense is provided; and a failure detecting means which detects the failure in at least one of the current sensors on the basis of the detected current values from the two current sensors and the estimated current value from the current estimating means.

A second aspect of the disclosure is a three-phase inverter system including: an inverter main circuit in which three series circuits are connected in parallel, in each of which an upper arm having a semiconductor switching device and a lower arm having a semiconductor switching device are connected in series across a DC power supply to output an AC current for one phase as an output current with the connection point of the upper and lower arms provided as an AC output terminal, and the AC output terminal in each of the series circuits is connected to a load with a connection line as the AC output terminal in each phase of three-phase AC output; and a control circuit which has the detected values of the output currents of the inverter main circuit inputted thereto to produce the driving signals of the semiconductor switching devices.

In the system, two connection lines in two phases of the connection lines in three phases connecting their respective AC output terminals in three phases to the load are provided with two current sensors as their respective ones which detect the values of output currents flowing in the two connection lines, the inverter main circuit includes two semiconductor switching devices with their respective current senses each of which devices is provided as the semiconductor switching device in one of the upper arm and lower arm in its own one phase of the two phases with the values of the output currents therein detected by the current sensors and further detects the current flowing in the arm in its own one phase of the two phases, and the control circuit includes: a driving signal producing means which has detected current values from the current sensors inputted thereto to produce the driving signals; a current estimating means which estimates, on the basis of detected signals from the two semiconductor switching devices with their respective current senses, output current values in the two phases in each of which its own one of the two semiconductor switching devices with their respective current senses are provided; and a failure detecting means which detects the failure in at least one of the current sensors on the basis of the detected current values from the two current sensors and the estimated current values from the current estimating means.

A third aspect of the disclosure is a three-phase inverter system according to the first or the second aspect in which system the potential of the output terminal of the semiconductor switching device with a current sense is made to be equal to the reference potential of the control circuit.

According to the disclosure, compared with the case where all of output currents in the three-phases are detected by current sensors, fewer current sensors are required. This enables the three-phase inverter system to be downsized with reduced cost and, along with this, to easily detect failures of current sensors.

Moreover, the driving signals of the semiconductor switching devices are produced on the basis of detected current values in two phases. Thus, compared with the case where the driving signals are produced on the basis of estimated current values, each being obtained from a semiconductor switching device with a current sense, there is an advantageous effect of being hard to be restricted by the switching frequency and the voltage amplitude command when carrying out the PWM control of the inverter. Therefore, when high-speed and low-loss switching devices formed of wide band gap semiconductor material are used for the three-phase inverter system, the advantages of the devices can be sufficiently exhibited.

BRIEF DESCRIPTION OF THE DRAWINGS

These and/or other aspects will become apparent and more readily appreciated from the following description of the embodiments, taken in conjunction with the accompanying drawings of which:

FIG. 4 is a diagram showing the configuration of the motor driving system described in Japanese Patent No. 5304967.

DESCRIPTION OF EMBODIMENTS

In the following, embodiments of the disclosure will be explained with reference to the attached drawings.

Figure 1:
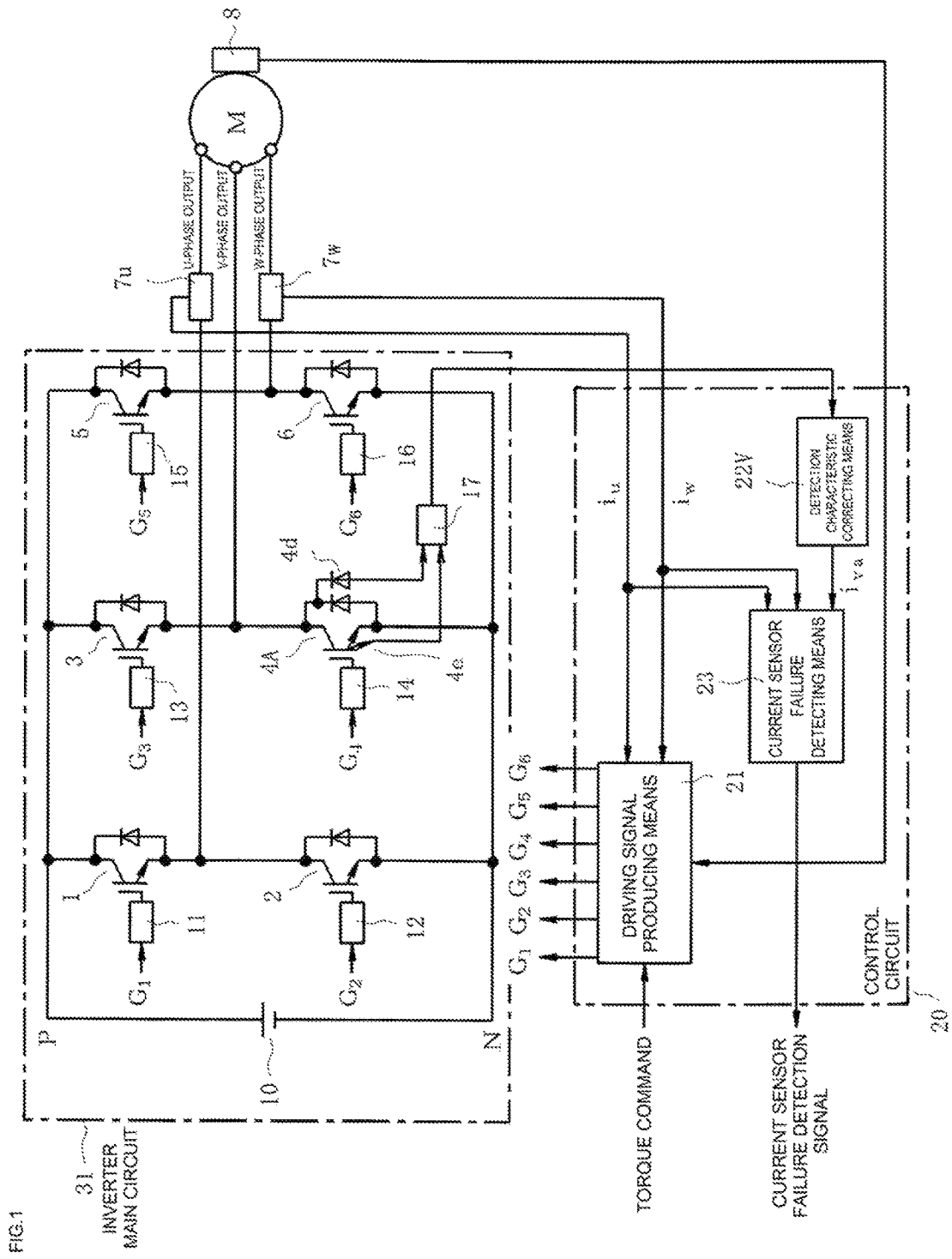
FIG. 1 is a diagram showing the configuration of a motor driving system to which a first embodiment of the disclosure is applied.

FIG. 1 is a diagram showing the configuration of a motor driving system to which a first embodiment of the disclosure is applied. In FIG. 1, an inverter main circuit 31 in three phases is formed of a DC power supply 10 and a bridge circuit connected across the DC power supply 10 and including semiconductor switching devices 1, 2, 3, 4A, 5 and 6. The series connection point of the semiconductor switching devices 1 and 2, the series connection point of the semiconductor switching devices 3 and 4A and the series connection point of the semiconductor switching devices 5 and 6 are connected to a motor M being a load with connection lines as a U-phase output terminal, a V-phase output terminal and a W-phase output terminal, respectively. On the motor M, an angle sensor 8 is mounted which detects the angle of rotation of the rotor of the motor M.

A U-phase output current outputted from the U-phase output terminal and a W-phase output current outputted from the W-phase output terminal are detected by current sensors 7u and 7w provided on the connection lines in the U-phase and W-phase, respectively, to be inputted to a control circuit 20 that will be explained later. The control circuit 20 produces gate signals $G_1$ through $G_6$, by which the on-off controls of the semiconductor switching devices 1, 2, 3, 4A, 5 and 6 are carried out through gate driving circuits 11 through 16, respectively.

Here, for the semiconductor switching device 4A in the lower arm in the V-phase where no current sensor is provided, a multi-emitter device is used as a semiconductor switching device with a current sense which is provided with a sense emitter 4e and sense diode 4d. The sense emitter 4e and sense diode 4d are connected to a sense detection signal processing circuit 17. Here, in the lower arm, instead of the semiconductor switching device 4A with a current sense, a normal semiconductor switching device can be used and, in the upper arm, instead of the semiconductor switching device 3, a semiconductor switching device with a current sense can be used.

In the embodiment, the semiconductor switching device with a current sense may be provided in the lower arm or in the upper arm in a phase (the V-phase in the embodiment shown in FIG. 1) other than two phases (the U-phase and the W-phase in the embodiment shown in FIG. 1) in which output currents are detected by current sensors. Here, when the semiconductor switching device 4A in the lower arm is provided as the semiconductor switching device with a current sense as is shown in FIG. 1 and the emitter terminal thereof as an output terminal is made to be at a potential equal to the reference potential (ground potential) of the control circuit 20, no insulation measure between the inverter main circuit 31 and the control circuit 20 becomes necessary to make the system effectively less expensive and downsized.

The semiconductor switching devices 1, 2, 3, 4A, 5 and 6, may be devices which are capable of high-speed operations with low loss with the use of wide bandgap semiconductor material such as SiC. Moreover, the kind of each of the semiconductor switching devices 1, 2, 3, 4A, 5 and 6 can be an IGBT, as is shown in FIG. 1, or an FET and a bipolar transistor.

The control circuit 20 is provided with a driving signal producing means 21, a detection characteristic correcting means 22V as a current estimating means and a current sensor failure detecting means 23.

The driving signal producing means 21, on the basis of a U-phase detected current value $i_u$ detected by the current sensor 7u, a W-phase detected current value $i_w$ detected by the current sensor 7w, a detected angle value detected by the angle sensor 8 and a torque command, produces the gate signals $G_1$, $G_2$, $G_3$, $G_4$, $G_5$ and $G_6$ of the semiconductor switching devices 1, 2, 3, 4A, 5 and 6, respectively.

To the detection characteristic correcting means 22V, the output signal of the sense detection signal processing circuit 17 is inputted and a V-phase estimated current value $i_{va}$ as the output of the detection characteristic correcting means 22V is inputted to the current sensor failure detecting means 23 together with the U-phase detected current value $i_u$ and the W-phase detected current value $i_w$. From the current sensor failure detecting means 23, a current sensor failure detection signal is outputted which indicates that the current sensor 7u or 7w is in failure when this is the case.

The function of the detection characteristic correcting means 22V is equivalent to the function performed by the current detecting units 308a and 308b and the adder 309 in FIG. 4. That is, the detection characteristic correcting means 22V, on the basis of the result of the addition of the information of the current flowing in the sense emitter 4e and the information of the reverse current (regenerative current) flowing in the sense diode 4d, provides the estimated value $i_{va}$ of a discrete sinusoidal V-phase current.

The current sensor failure detecting means 23, on the basis of the U-phase detected current value $i_u$, W-phase detected current value $i_w$ and V-phase estimated current value $i_{va}$ which are inputted thereto, detects the failure of the current sensor 7u or 7w. For example, when the sum of the currents $i_u$, $i_w$ and $i_{va}$ is not zero, the current sensor failure detecting means 23 makes a decision that either the current sensor 7u or the current sensor 7w is in failure. Additionally or alternatively, the current sensor failure detecting means 23 can obtain an averaged value in one period with respect to each of the U-phase detected current value $i_u$ and the W-phase detected current value $i_w$ and, when there is a phase in which the averaged value is not zero, make a decision that the current sensor in the concerned phase (the current sensor 7u or the current sensor 7w) is in failure.

The operation of the embodiment will be explained below.

When the current sensors 7u and 7w are operating normally, the driving signal producing means 21 carries out the specified arithmetic operation on the basis of current information on the U-phase detected current value $i_u$, the W-phase detected current value $i_w$ and a V-phase operated current value $i_v$ obtained by the operation $i_v=-(i_u+i_w)$ with a torque command and a detected angle value to thereby produce the gate signals $G_1$ through $G_6$.

During the foregoing operation, no failure of the current sensor 7u or 7w is detected by the current sensor failure detecting means 23.

When a failure occurs in any one of the current sensors 7u and 7w, the current sensor failure detecting means 23, from the fact that the sum of the U-phase detected current value $i_u$, W-phase detected current value $i_w$ and V-phase estimated current value $i_{va}$ does not become zero, decides that any one of the current sensors 7u and 7w is in failure to output the current sensor failure detection signal. Additionally or alternatively, the current sensor failure detecting means 23, from the fact that the averaged value in a period of the detected current value $i_u$ or $i_w$ in the phase with a current sensor in failure does not become zero, may decide that the current sensor 7u or 7w in the corresponding phase is in failure to output the current sensor failure detection signal.

Figure 2:
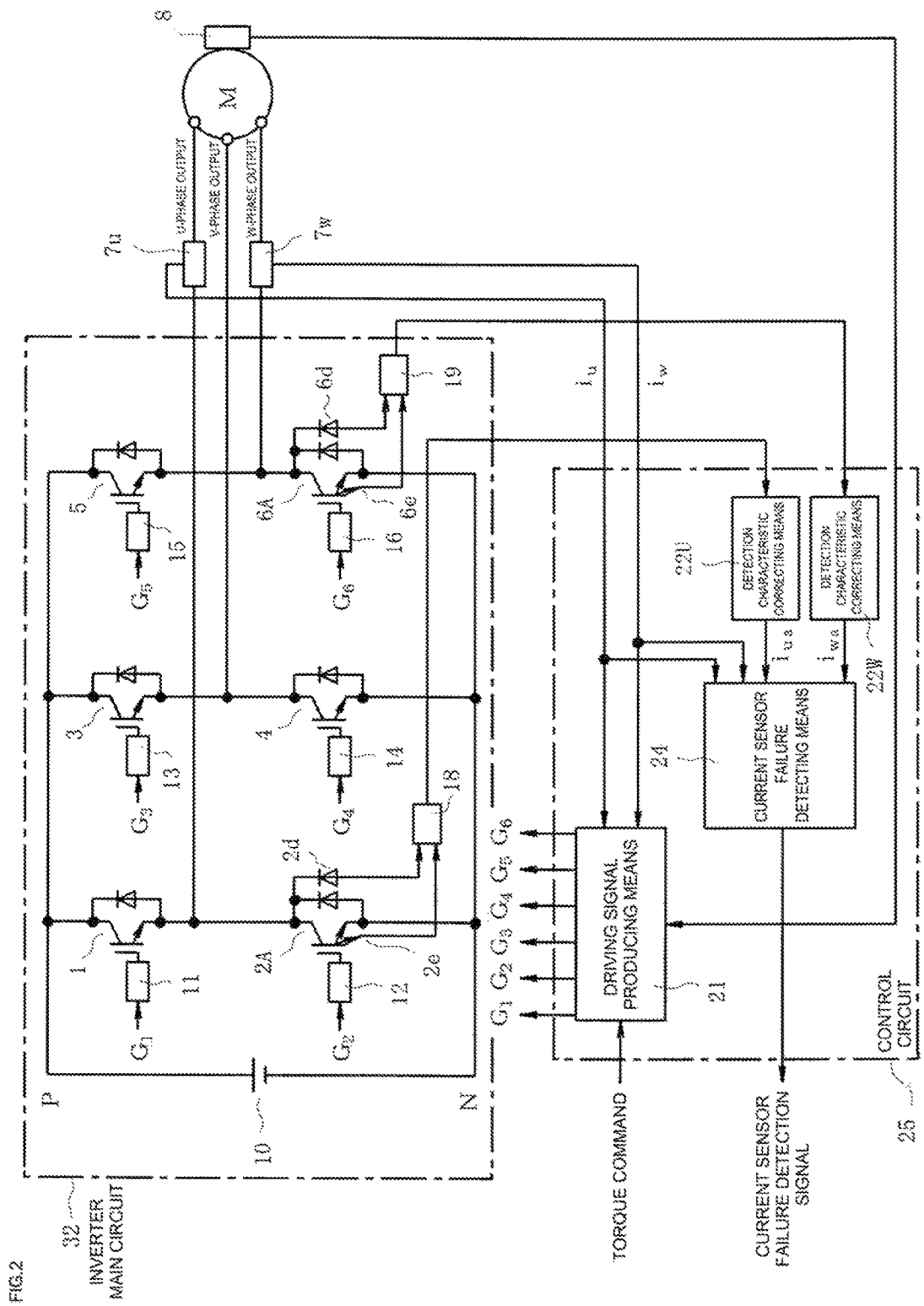
FIG. 2 is a diagram showing the configuration of a motor driving system to which a second embodiment of the disclosure is applied.
Figure 3:
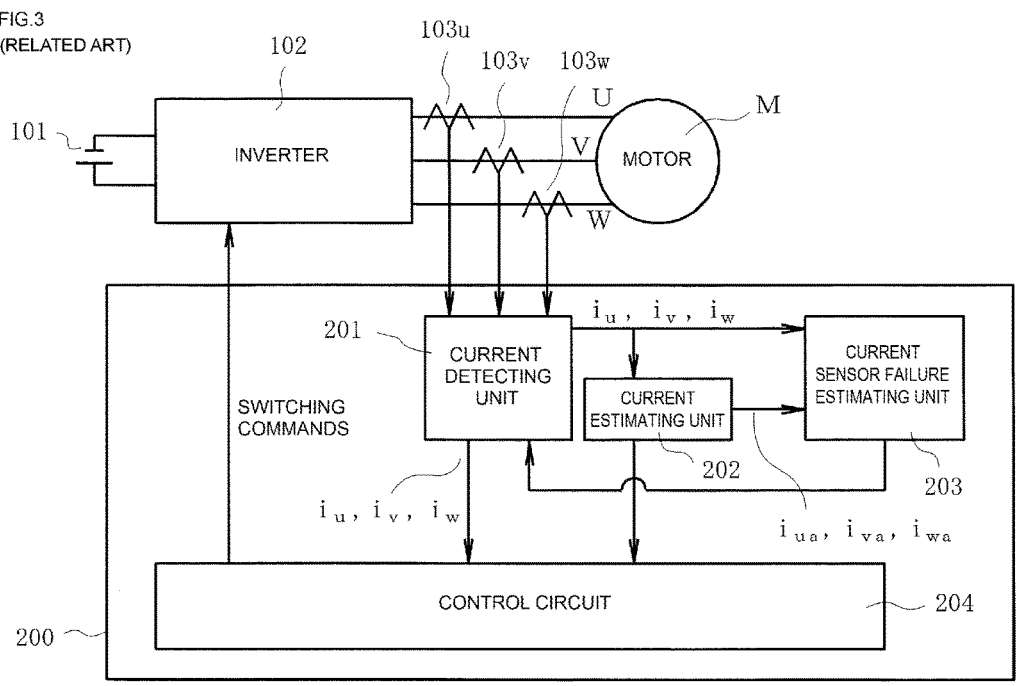
FIG. 3 is a diagram showing the configuration of the motor driving system described in Japanese patent application publication JP-A-2008-22645.

FIG. 2 is a diagram showing the configuration of a motor driving system to which a second embodiment of the disclosure is applied. Components with the same functions as those of the components shown in FIG. 1 will be denoted with the same reference numerals and signs. In the following, the system will be explained with particular emphasis on the sections different from those shown in FIG. 1.

In an inverter main circuit 32 shown in FIG. 2, a semiconductor switching device 2A as a multi-emitter device in the lower arm in the U-phase is a semiconductor switching device with a current sense that is provided with a sense emitter 2e and a sense diode 2d. Also in the inverter main circuit 32 shown in FIG. 2, a semiconductor switching device 6A as a multi-emitter device in the lower arm in the W-phase is a semiconductor switching device with a current sense that is provided with a sense emitter 6e and a sense diode 6d. No current sense function is provided in any one of the other semiconductor switching devices 1, 3, 4 and 5. The sense emitter 2e and sense diode 2d are connected to a sense detection signal processing circuit 18 and the sense emitter 6e and sense diode 6d are connected to a sense detection signal processing circuit 19.

The output signals of the sense detection signal processing circuits 18 and 19 are inputted to detection characteristic correcting means 22U and 22W, respectively, each of which is a current estimating means in a control circuit 25. A U-phase estimated current value $i_{ua}$ and W-phase estimated current value $i_{wa}$ outputted from the detection characteristic correcting means 22U and 22W, respectively, are inputted to a current sensor failure detecting means 24. Like in the system shown in FIG. 1, the U-phase detected current value $i_u$ and W-phase detected current value $i_w$ are inputted to the driving signal producing means 21 and to the current sensor failure detecting means 24.

That is, in this embodiment, the phase in which the semiconductor switching device with a current sense 2A is used is the same phase in which the current sensors 7u is provided (i.e. the U-phase) and the phase in which the semiconductor switching device with a current sense 6A is used is the same phase in which the current sensors 7w is provided (i.e. the W-phase).

The operation of the driving signal producing means 21 is similar to the operation of the driving signal producing means 21 shown in FIG. 1. In the operation, the driving signal producing means 21 carries out the specified arithmetic operation on the basis of current information on the U-phase detected current value $i_u$, the W-phase detected current value $i_w$ and a V-phase operated current value $i_v$ (which may be obtained by the operation $i_v=-(i_u+i_w)$) with a torque command and a detected angle value further to thereby produce the gate signals $G_1$ through $G_6$.

The detection characteristic correcting means 22U and 22W obtain the U-phase estimated current value $i_{ua}$ and W-phase estimated current value $i_{wa}$, respectively, to output them to the current sensor failure detecting means 24. The current sensor failure detecting means 24, having the U-phase detected current value $i_u$ and W-phase detected current value $i_w$ also inputted thereto, can detect a failure in at least one of the current sensors 7u and 7w to output a current sensor failure detection signal by comparing the U-phase detected current value $i_u$ with the U-phase estimated current value $i_{ua}$ and compares the W-phase detected current value $i_w$ with the W-phase estimated current value $i_{wa}$. Additionally or alternatively, the current sensor failure detecting means 24 can obtain an averaged value in one period with respect to each of the U-phase detected current value $i_u$ and the W-phase detected current value $i_w$ and, when there is a phase in which the averaged value is not zero, make a decision that the current sensor in the concerned phase (the current sensor 7u or the current sensor 7w) is in failure.

The current sensor failure detection signal is used to indicate a current sensor in a state of failure. Examples of current sensor failure detection signals may be cutting off some of the gate signals $G_1$ through $G_6$ through the driving signal producing means 21 or by generating an alarm. However, there is no special limitation in the use.

Furthermore, the failure detecting means according to the disclosure can be also applied to a three-phase inverter system having current sensors in all of the three phases in the inverter main circuit thereof.

The disclosure, in addition to the motor driving system, can be applied to three-phase inverter systems that drive various AC loads.

Any identification in this disclosure of problems, deficiencies, or other characterizations of any product or method of the related art does not imply or admit that such problems, deficiencies, or other characterizations were known in the prior art even if the product or method itself was known in the prior art.

While the present disclosure has been particularly shown and described with reference to the embodiments thereof, it will be understood by those skilled in the art that the foregoing and other changes in form and details can be made therein without departing from the spirit and scope of the present disclosure.

What is claimed is:

1. A three-phase inverter system comprising:
   an inverter main circuit connectable to a DC power supply and comprising three series circuits connected in parallel with each other, wherein
   each of the three series circuits outputs an AC current for a respective one of three phases as an output current,
   each of the three series circuits comprises
      an upper arm having an upper-arm semiconductor switching device,
      a lower arm having a lower-arm semiconductor switching device, connected to the upper arm in series, and, when the inverter main circuit is connected to the DC power supply, connected to the upper arm in series across the DC power supply, and
      an AC output terminal connected between the upper arm and lower arm, and configured to output the respective output current to a load by a connection line, and configured to output the respective output current, and
   in one of the three series circuits, one of the upper-arm and lower-arm semiconductor switching devices is a semiconductor switching device with a current sense, and the semiconductor switching device with the current sense detects current flowing in the one of the three series circuits;
   two current sensors configured to detect values of output currents flowing in the two respective connection lines of the other two of the three series circuits; and
   a control circuit configured to
      detect current values from the current sensors inputted thereto and produce driving signals, which drive the upper-arm and lower-arm semiconductor switching devices of the inverter main circuit, based on the detected current values,
      estimate, based on a detected signal from the semiconductor switching device with the current sense, an output current value in the one of the three series circuits, and
      detect failure in at least one of the current sensors based on the detected current values from the two current sensors and the estimated output current value.

2. The three-phase inverter system according to claim 1, a potential of the AC output terminal of the semiconductor switching device with the current sense is configured to equal a reference potential of the control circuit.

3. The three-phase inverter system according to claim 1, wherein the control circuit is configured to
determine a sum of the detected current values of two current sensors and the estimated output current value, and
detect the failure in the at least one of the current sensors based on the sum.

4. The three-phase inverter system according to claim 1, wherein the control circuit is configured to
determine an average value, across a certain period, of the detected current values of the at least one of the two current sensors, and
detect the failure in the at least one of the two current sensors based on the average value.

5. The three-phase inverter system according to claim 1, wherein the semiconductor switching device with the current sense has a plurality of emitters, one of which is connected to the control circuit.

6. A three-phase inverter system comprising:
an inverter main circuit connectable to a DC power supply and comprising three series circuits connected in parallel with each other, wherein
each of the three series circuits outputs an AC current for a respective one of three phases as an output current,
each of the three series circuits comprises
an upper arm having an upper-arm semiconductor switching device,
a lower arm having a lower-arm semiconductor switching device, connected to the upper arm in series, and, when the inverter main circuit is connected to the DC power supply, connected to the upper arm in series across the DC power supply, and
an AC output terminal connected between the upper arm and lower arm, and configured to output the respective output current to a load by a connection line, and
in one of the three series circuits, one of the upper-arm and lower-arm semiconductor switching devices is a semiconductor switching device with a current sense, and the semiconductor switching device with the current sense detects current flowing in the one of the three series circuits;
two current sensors configured to detect values of output currents flowing in the two respective connection lines of the two of the three series circuits; and
a control circuit configured to
detect current values from the current sensors inputted thereto and produce driving signals, which drive the upper-arm and lower-arm semiconductor switching devices of the inverter main circuit, based on the detected current values;
estimate, based on respective detected signals from the two semiconductor switching devices with respective current senses, output current values in the two of the three series circuits; and
detect failure in at least one of the current sensors based on the detected current values from the two current sensors and the estimated output current values.

7. The three-phase inverter system according to claim 6, a potential of the AC output terminal of the semiconductor switching device with a current sense is configured to equal a reference potential of the control circuit.

8. The three-phase inverter system according to claim 6, wherein the control circuit is configured to detect failure in the current sensors by comparing the estimated output current values with the detected current values from the two current sensors.

9. The three-phase inverter system according to claim 6, wherein the control circuit is configured to
determine an average value, across a certain period, of the detected current values of the at least one of the two current sensors, and
detect the failure in the at least one of the two current sensors based on the average value.

10. The three-phase inverter system according to claim 6, wherein, in each of two of the three series circuits,
the semiconductor switching device with the current sense has a plurality of emitters, one of which is connected to the control circuit.

* * * * *